May 17, 1966  H. O. SCHRÖTER  3,251,239
BRAKE LINKAGE
Filed March 29, 1962
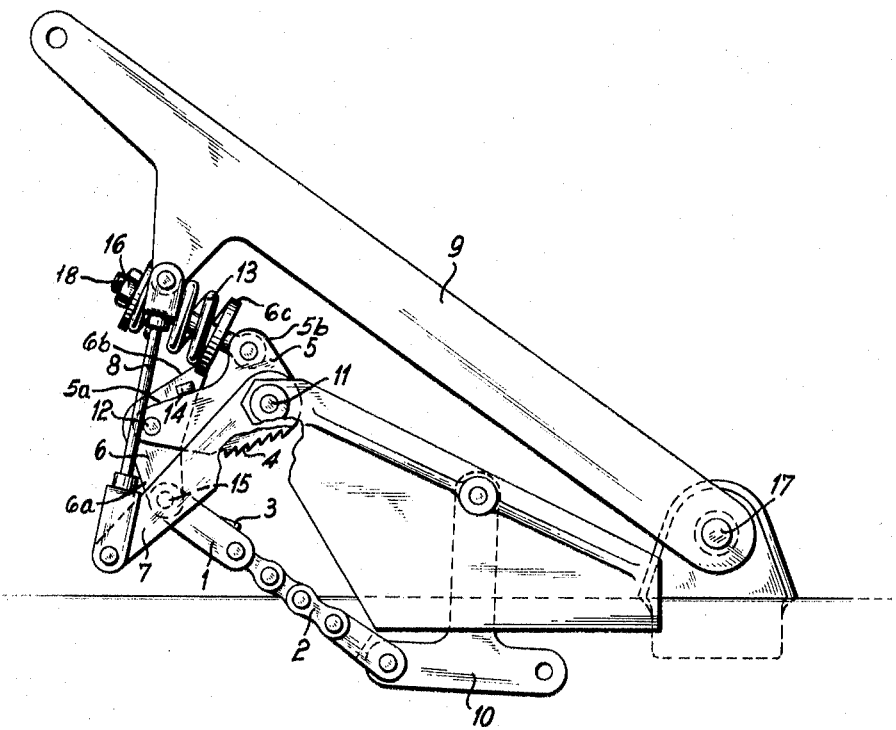
INVENTOR
HANS O. SCHRÖTER
By Toulmin & Toulmin
Attorneys

United States Patent Office 3,251,239
Patented May 17, 1966

3,251,239
BRAKE LINKAGE
Hans O. Schröter, 18 Robert-Koch Strasse,
Munich 22, Germany
Filed Mar. 29, 1962, Ser. No. 183,659
5 Claims. (Cl. 74—516)

The present invention relates to a brake linkage system for actuating brakes of all types, more particularly, to a brake linkage system for actuating the wheel brakes of motor vehicles by means of a lever which progressively applies to the brakes a rapidly increasing braking force with respect to the actuating force.

One form of a brake includes a lever which, when pivoted by an actuating force, applies through a suitable brake linkage system a braking force to the braking members of a brake. This lever structure is particularly found in the so-called emergency brakes for motor vehicles. Such braking systems usually develop some play and, as a result, the braking force is not applied to the braking members until the brake lever has been pivoted through an angle to compensate for the play. The braking force is then suddenly applied to the brakes with the result that there is a so-called "grabbing" of the brakes which may cause the vehicle to be difficult to be controlled by the operator.

It was therefore proposed to construct brake linkage systems in such a manner that the ratio of the braking force with respect to the actuating force rapidly increased up to the point where the brake members were securely applied to the brakes. This ratio was usually varied as a function of the path of the brake linkage since this construction was relatively simple.

However, this structure had the disadvantage that satisfactory braking action was attained only when the brake linkage system was previously adjusted in a predetermined way. Thus, it was necessary to periodically adjust the brake linkage in order to obtain the advantages of such a brake linkage system.

It is therefore the principal object of the present invention to provide a novel and improved brake linkage for applying a rapidly increasing braking force with respect to the actuating force.

It is a further object of the present invention to provide a brake linkage wherein a satisfactory braking effect can be obtained independently of the adjustment of the brake linkage system and without any regard to the amount of play within the braking system.

The objects of the present invention are obtained by a brake linkage system wherein the linkage connection leading to the braking members is connected through a spring with a braking lever which varies the ratio of the braking force to the actuating force. Cooperating locking means are provided between this linkage connection and the braking lever so that the linkage and the braking lever may be locked together when the braking lever has been pivoted through a predetermined angle by an actuating lever. The locking-together of the linkage connection and the braking lever eliminates the effect of the spring connection.

The spring is prestressed with such an initial stress that the brake members are securely applied prior to eliminating the spring effect. In addition, the force characteristics of the spring are such that during the increase of this force ratio the product of the spring tension and the effective lever arm acting upon the linkage connection leading to the brakes is maintained constant during the period when the spring member is effective.

A further advantage of this brake linkage is that another spring may so be mounted with respect to the braking lever and the linkage connection to the braking members that the tension in this spring is imparted to the operating lever in the last phase of operating the lever so as to assist in the braking operation. This added force may be obtained without accelerating the operating lever during the last phase of the braking step.

The simple yet effective brake linkage system of the present invention enables a braking force to be rapidly but gradually applied to the braking members, regardless of the amount of mechanical play in the brake system. The increase of the braking force with respect to the actuating force occurs, regardless of whether the brake has been adjusted for a large or small amount of play.

The spring is so mounted with respect to the braking lever and the linkage connection to the braking members that a tension is imparted to the spring when the brakes are applied. The presence of this tension assists in releasing the brakes when the brake lever is pivoted in the release direction. Thus, a minimum of force is required to release the brakes.

Other objects and advantages of the present invention will be readily apparent upon reference to the accompanying description and the single drawing which is an elevational view showing, somewhat schematically, the components of the brake linkage of the present invention.

A specific embodiment of the present invention will next be described in detail with reference to the drawing.

The linkage connection leading to the braking members of a brake comprises an end member 1 connected by several sections of a sprocket chain 2 to a pivotally mounted T-lever 10. The other end of the T-lever 10 is connected through a suitable connection to the braking members. The T-lever 10 is pivotally mounted on a frame which may be a portion of the vehicle.

The end member 1 is provided with a pawl 3 which is engageable with ratchet teeth 4 located on an edge of a braking lever 5 which is pivotally mounted at 11 on a stationary portion of the vehicle. The braking lever 5 is essentially in the shape of a crank and comprises a lever arm 5a and a lever arm 5b.

An intermediate lever 6 is pivotally mounted at 12 on the end of the lever arm 5a. The intermediate lever 6 comprises lever arms 6a and 6b. The end member 1 is pivotally mounted at 15 to the end of the lever arm 6a.

The lever arm 6b is provided with a flat portion 6c which is engaged by a spring 13 mounted upon a rod 18 which, in turn, is pivotally mounted on the lever arm 5b of the braking lever 5. An adjusting nut 16 is provided to vary the tension in the spring 13.

There is a stop or abutment 14 located on the side of the lever arm 6b and engageable with one edge of the lever arm 5a of the braking lever.

Also pivotally mounted at 11 is an actuating lever 7 which is fixedly connected to the braking lever 5 so as to pivot therewith. A tension linkage 8 connects the outer end of the actuating lever 7 with an operating lever 9. The operating lever 9 is pivotally mounted at 17 on the frame and is suitably connected to a brake lever which is not shown or an operating handle.

The brake linkage system as described above operates in the following manner: When the operating lever 9 is pivoted in a clockwise direction about its pivot point 17, the braking lever 5 is also pivoted in the same direction of rotation but at a greatly increased angular velocity by means of the tension linkage 8 and the actuating lever 7. This pivoting movement of the braking lever 5 carries along the intermediate lever 6 and, accordingly, the linkage 1 and 2 is moved in the direction to apply the brake. The spring 13 urges against the end portion 6c so that the stop member 14 remains in engagement with the braking lever 5.

As the brake members begin to apply the brake shoes against the braking surfaces, an increasing resistance is placed upon the linkage connection 1 and 2. At a certain point the initial stress in the spring 13 will be overcome but the braking lever 5 will continue to pivot in the counterclockwise direction under the action of the operating lever 9. Upon overcoming the initial stress in the spring 13, the intermediate member 6 will rotate in a clockwise direction about its pivot point 12 and the pawl 3 on the end member 1 will lockingly engage the ratchet teeth 4 on the braking lever 5. Upon this locking engagement of the pawl and the ratchet teeth, the effect of the spring connection 13 between the linkage 1 and 2 and the braking lever 5 is eliminated. The brake linkage 1 and 2 is now positively connected with the braking lever 5 as well as with the actuating lever 7. Thus, any further clockwise pivoting of the operating lever 9 directly applies a braking force to the braking members because of the locking engagement between the end member 1 and the braking lever 5.

In order to disengage or release the brake, the operating lever 9 is pivoted in the reverse direction or the counterclockwise direction. As a result, all of the levers will return to their original positions as shown in the drawing.

It is pointed out that the length of the lever arm acting upon the brake linkage 1 and 2 varies as the distance between the pivot point 15 and the pivot point 11 of the braking lever. It can be seen that pivoting of the braking lever 5 in the clockwise direction will quickly reduce the length of this lever arm and accordingly the amount of the braking force will increase since the same actuating force is being exerted on the operating lever and through the same lever arm.

Because of the spring connection between the linkage 1 and 2 and the braking lever 5, the braking force will be smoothly but quickly applied to the braking members. Thus, the brake linkage system of the present invention is particularly applicable for use as an emergency brake in a motor vehicle, since braking force will be rapidly but smoothly transmitted to the braking members, regardless of the actuating force applied to the operating lever 9. Since, in most cases, this actuating force is suddenly applied to the operating lever 9, the brake linkage system of the present invention serves an important role in quickly but smoothly increasing the amount of braking force which is applied to the braking members of the brakes.

Thus, the present invention provides a simple yet effective braking linkage system for rapidly increasing the ratio of the force transmitted to the braking members to the force applied to the brake lever. This increase in the ratio is accomplished by varying the path of the brake linkage connection but utilizing a spring connection between this brake linkage and a pivotally mounted braking lever whose effective moment arm with respect to the brake linkage is continuously changing.

It will be understood that this invention is susceptible to modification in order to adapt it to different usages and conditions and, accordingly, it is desired to comprehend such modifications within this invention as may fall within the scope of the appended claims.

What is claimed as this invention is:

1. A brake linkage for applying a rapidly increasing braking force comprising, a pivotally mounted braking lever having long and short arms and ratchet teeth thereon, an intermediate lever having oppositely extending lever arms pivotally connected to the long arm of the braking lever, a linkage having an end member connected to one arm of said intermediate lever and a sprocket chain connecting said end member to the braking members of a brake, said end member having a pawl thereon engageable with said ratchet teeth when said braking lever has pivoted through a predetermined angle, a spring interconnecting the other arm of said intermediate lever and the short arm of said braking lever, said pawl lockingly engaging said ratchet teeth to lock said linkage and braking lever together when said braking lever has been pivoted through a predetermined angle whereby the effect of said spring connection is eliminated.

2. A brake linkage for applying a rapidly increasing braking force comprising, a crank-shaped braking lever having first and second lever arms and ratchet teeth on the outer edge thereof, an intermediate lever pivoted on said first lever arm and having third and fourth lever arms, an end member having a pawl thereon engageable with said ratchet teeth and pivotally connected to said third lever arm, a sprocket chain connecting said end member and the braking members of a brake, a rod pivotally mounted on said second lever arm, a spring mounted on said rod and urging said fourth lever arm toward said second lever arm, an actuating lever having one end fixedly connected to said braking lever, and a link connecting the operating lever to the other end of said actuating lever so that pivoting of said braking lever through said actuating lever and operating lever connection through a predetermined angle lockingly engages said end member pawl with said braking lever ratchet teeth whereby said end member and braking lever are locked together and the effect of said spring connection is eliminated.

3. A brake linkage for applying a rapidly increasing braking force comprising, a pivotally mounted actuating lever, a braking lever fixedly connected to said actuating lever to pivot therewith, a linkage connected to the braking members of a brake, an intermediate lever pivotally mounted on said braking lever said intermediate lever having two lever arms with one of the arms connected to said linkage, a spring resiliently interconnecting the other arm of said intermediate lever to said braking lever, and means on said linkage and said braking lever for locking said linkage and braking lever together when said braking lever has been pivoted through a predetermined angle by said actuating lever whereby the effect of said spring connection is eliminated.

4. A brake linkage for rapidly increasing braking force comprising, a pivotally mounted crank-shaped braking lever, an actuating lever fixed thereto for pivoting said braking lever in a clockwise direction, an end member, linkage connecting one end of the end member to the brake member, the other end of said end member being pivotally connected to both arms of the braking lever by means of a spring-actuated intermediate lever, means on the end member and the adjacent portion of the braking lever for positively locking them together for rotation in a clockwise direction when said braking lever has rotated through an initial predetermined angle and said end member being connected for movement through said initial predetermined angle solely by said spring-actuated intermediate lever whereby the braking lever acts upon the brake linkage with a variable mechanical advantage.

5. A brake linkage for applying a rapidly increasing braking force comprising, in combination a brake element, a pivoted brake lever, means rotating said lever in one direction during braking action, means operating through said brake lever applying spring pressure to said brake element during initial movement of the brake lever in said one direction, and means directly connecting the brake element to the brake lever for movement therewith during subsequent movement of the brake lever in the said one direction, said first named means being the only means operating the brake element during the initial movement of the brake lever and said second named means being the only means operating the brake element during the subsequent movement of the brake lever.

References Cited by the Examiner

UNITED STATES PATENTS

| | | | |
|---|---|---|---|
| 2,100,563 | 11/1937 | Macpherson et al. | 74—517 |
| 2,190,972 | 2/1940 | Boldt | 74—516 |
| 2,985,032 | 5/1961 | Schroeder et al. | 74—516 X |

BROUGHTON G. DURHAM, Primary Examiner.